US012584849B2

(12) United States Patent
Kim et al.

(10) Patent No.: US 12,584,849 B2
(45) Date of Patent: Mar. 24, 2026

(54) SYSTEM AND METHOD FOR MEASURING OF COMPOSITION OF INK DROPLETS

(71) Applicant: Samsung Display Co., LTD., Yongin-si (KR)

(72) Inventors: Woong Kim, Yongin-si (KR); Manjae Park, Yongin-si (KR); Wanglim Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 153 days.

(21) Appl. No.: 18/653,831

(22) Filed: May 2, 2024

(65) Prior Publication Data

US 2025/0102418 A1 Mar. 27, 2025

(30) Foreign Application Priority Data

Sep. 27, 2023 (KR) ......................... 10-2023-0131161

(51) Int. Cl.
*B41J 2/175* (2006.01)
*B41J 3/407* (2006.01)
(Continued)

(52) U.S. Cl.
CPC ............ *G01N 15/149* (2024.01); *B41J 2/175* (2013.01); *B41J 3/407* (2013.01); *G01N 2015/144* (2013.01)

(58) Field of Classification Search
CPC ......... B41J 2/175; B41J 3/407; H10K 71/135; G01N 15/0227; G01N 15/1433;
(Continued)

(56) References Cited

U.S. PATENT DOCUMENTS 5,751,416 A * 5/1998 Singh ...................... G01J 3/021
356/417
6,909,505 B2 6/2005 Lucas et al.
(Continued)

FOREIGN PATENT DOCUMENTS

CN 109900623 B 5/2021
EP 1520164 B1 8/2017
(Continued)

*Primary Examiner* — Anh T Vo
(74) *Attorney, Agent, or Firm* — CANTOR COLBURN LLP

(57) ABSTRACT

Provided are a system and method for measuring composition of ink droplets for a more precise fine inkjet printing process. The system includes a camera device configured to generate first image data including first ink droplets in a first target range among a plurality of ink droplets discharged onto and present on a substrate, a laser irradiation device configured to generate particles by irradiating each of the first ink droplets with laser beams, a particle suction component spaced apart from the substrate by a certain distance and including an inner surface which is a Coanda surface that is convex inward, a gas injection device configured to inject inert gas into the particle suction component to move the inert gas along the Coanda surface, and a mass spectrum measurement device configured to measure a mass spectrum of the particles extracted through the particle suction component with the inert gas.

20 Claims, 6 Drawing Sheets

(51) Int. Cl.
     *G01N 15/1434*     (2024.01)
     *G01N 15/149*     (2024.01)
(58) Field of Classification Search
     CPC ............. G01N 15/14; G01N 2015/144; G01N
              2015/149; G01N 15/1492; G01N 21/718;
                                    G01N 49/04
     See application file for complete search history.

(56)                 References Cited

U.S. PATENT DOCUMENTS

| | | |
|---|---|---|
| 7,106,439 B2 * | 9/2006 | Lacour ................. G01N 21/718 |
| | | 356/326 |
| 7,663,749 B2 | 2/2010 | Levesque et al. |
| 9,496,124 B2 | 11/2016 | Günther et al. |
| 9,678,015 B2 * | 6/2017 | Fagan .................... G01N 21/84 |
| 2021/0341392 A1 * | 11/2021 | Bol'shakov ......... H01J 49/0463 |
| 2022/0181135 A1 | 6/2022 | Hattendorf et al. |

FOREIGN PATENT DOCUMENTS

| | | | |
|---|---|---|---|
| KR | 101009845 B1 | 1/2011 | |
| KR | 101882186 B1 | 7/2018 | |
| KR | 102144973 B1 | 8/2020 | |

* cited by examiner

SYSTEM AND METHOD FOR MEASURING OF COMPOSITION OF INK DROPLETS

This application claims priority to Korean Patent Application No. 10-2023-0131161, filed on Sep. 27, 2023, and all the benefits accruing therefrom under 35 U.S.C. § 119, the content of which in its entirety is herein incorporated by reference.

BACKGROUND

1. Field

One or more embodiments relate to a system for measuring composition of ink droplets and a method of measuring composition of ink droplets, and more particularly, to a system for measuring composition of ink droplets and a method of measuring composition of ink droplets for a more precise fine inkjet printing process.

2. Description of the Related Art

Industrial inkjet printers may use not only general dyes, but also metal materials such as, for example, copper, gold, and silver, ceramics, and polymer as printing solutions. A direct printing method on various targets such as, for example, substrates, films, fabrics, and displays may be used for industrial graphics, displays, and solar cells. In particular, in the field of displays, a process using an inkjet printer may be applied to manufacturing of color filters, a liquid crystal orientation process, manufacturing of an organic emission layer, and manufacturing of a quantum dot emission layer. An inkjet printing device may include an inkjet printing head including at least one ink transfer passage (or nozzle).

Among materials contained in ink, a certain material in the ink may be precipitated over time. Depending on an environment in which an inkjet printing process is performed, a concentration of a certain material contained in ink discharged from a nozzle may change.

SUMMARY

One or more embodiments include a system for measuring composition of ink droplets and a method of measuring composition of ink droplets for a more precise fine inkjet printing process. However, the objects are examples and do not limit to the scope of the disclosure.

Additional aspects will be set forth in part in the description which follows and, in part, will be apparent from the description, or may be learned by practice of the presented embodiments of the disclosure.

According to one or more embodiments, a system for measuring composition of ink droplets includes a camera device configured to generate first image data including first ink droplets in a first target range from among a plurality of ink droplets discharged onto and present on a substrate, a laser irradiation device configured to generate particles by irradiating each of the first ink droplets with laser beams, a particle suction component spaced apart from the substrate by a certain distance and including an inner surface, where the inner surface is a Coanda surface and is convex inward, a gas injection device configured to inject inert gas into the particle suction component to move the inert gas along the Coanda surface, and a mass spectrum measurement device configured to measure a mass spectrum of the particles extracted through the particle suction component with the inert gas.

The particle suction component may include an inlet through which the inert gas is injected from an outside of the particle suction component, and an outlet from which the inert gas is discharged into the particle suction component.

The particle suction component may further include a guide configured to guide the inert gas to be discharged along the Coanda surface.

The system may further include a driving stage configured to move the substrate to change a target to irradiate with the laser beams.

The system for measuring composition of ink droplets may further include a computing device configured to obtain first gray scale information for each of the first ink droplets based on the first image data.

The computing device may obtain first concentration information of a target material included in each of the first ink droplets based on the first gray scale information.

The computing device may obtain second concentration information of the target material included in each of the first ink droplets based on the mass spectrum.

The computing device may obtain offset data based on the first concentration information and the second concentration information.

The camera device may obtain second image data including second ink droplets in a second target range from among the plurality of ink droplets.

The computing device may obtain second gray scale information for each of the second ink droplets based on the second image data.

The computing device may obtain third concentration information of a target material included in each of the second ink droplets based on the second gray scale information and the offset data.

The computing device may generate printing sequence information based on the third concentration information and generate a control command for performing a printing process based on the printing sequence information.

The target material may include $TiO_2$.

According to one or more embodiments, a method of measuring composition of ink droplets includes obtaining first gray scale information for each of first ink droplets in a first target range from among a plurality of ink droplets discharged onto and included on a substrate, obtaining first concentration information of a target material included in each of the first ink droplets based on the first gray scale information, obtaining a mass spectrum for each of the first ink droplets, obtaining second concentration information of the target material included in each of the first ink droplets based on the mass spectrum, obtaining offset data based on the first concentration information and the second concentration information, obtaining second gray scale information for each of second ink droplets in a second target range from among the plurality of ink droplets, and obtaining third concentration information of the target material included in each of the second ink droplets based on the second gray scale information and the offset data.

The method may further include generating printing sequence information based on the third concentration information.

The method may further include generating a control command for performing a printing process based on the printing sequence information.

The obtaining of the first gray scale information may include generating a preparation command for a printing head, generating a control command for discharging the plurality of ink droplets on the substrate, and obtaining first image data including the first ink droplets.

The obtaining of the first gray scale information may further include obtaining the first gray scale information for each of the first ink droplets based on the first image data.

The obtaining of the second concentration information of the target material may include obtaining the second concentration information of the target material included in each of the first ink droplets based on a pre-prepared concentration-mass spectrum curve, and obtaining volume information of each of the first ink droplets and quantifying the second concentration information based on the volume information.

The target material may include $TiO_2$.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
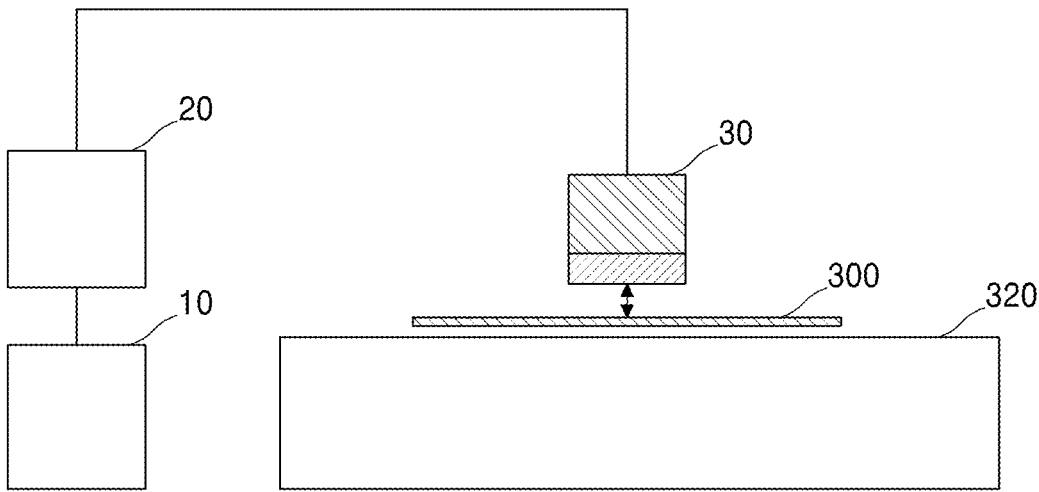
FIG. 1 is a schematic conceptual diagram of a printing system in accordance with one or more embodiments of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described herein, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. The attached drawings for illustrating embodiments are referred to gain a sufficient understanding of embodiments, the merits thereof, and the objectives accomplished by the implementation of the disclosure. However, the disclosure is not limited to the embodiments disclosed below, but may be implemented in various different forms.

Hereinafter, the disclosure will be described in detail by explaining the embodiments with reference to the attached drawings, the same reference numerals in the drawings denote like elements, and a repeated explanation thereof will not be given.

In the present specification, terms such as, for example, first and second are used for the purpose of distinguishing one component from another component without a limiting meaning. In the following embodiments, the singular expressions include the plural expressions unless clearly specified otherwise in context.

In the following embodiments, when an element such as, for example, a layer, a film, a region, and a board is referred to as being "on" another element, the element may be directly on another element or intervening elements.

For convenience of explanation, the components may be exaggerated or reduced in the diagrams. For example, sizes and thicknesses of the elements illustrated in the drawings are for the purpose of descriptive convenience, and thus the disclosure is not necessarily limited thereto.

In the present specification, terms such as, for example, include, have, comprise, or contain represent that the features or elements described in the specification exist, and do not preclude the possibility that one or more other features or elements may be added.

In the present specification, when various components such as, for example, a layer, a film, a region, and a plate are referred to as being "on" other components, this includes the case in which the components is "directly on" other components as well as the case in which other components are located therebetween.

When it is possible to implement any embodiment, a certain process order may be different from the described order. For example, aspects of the present disclosure support embodiments in which a process order is different from a process order described with reference to another embodiment. For example, two processes described continuously may be performed substantially at the same time, or may be performed in an opposite order to the described order. The term "substantially," as used herein, means approximately or actually the same (e.g., within a threshold difference amount).

In the present specification, the expression "A and/or B" represents the case of A, B, or A and B. In addition, the expression "at least one of A and B" represents the case of A, B, or A and B.

In the present specification, descriptions in which films, regions, components, and the like are connected may include a case in which films, regions, and components are directly connected and/or a case in which other films, regions, and components are located between the films, regions, and components. For example, descriptions in which a film, a region, a component, and the like are electrically connected may represent the case in which a film, a region, a component, and the like are directly electrically connected and/or the case of indirect electrical connection in which another film, region, component, and the like are located therebetween.

In the present specification, the x-axis, y-axis, and z-axis are not limited to the three axes of the Cartesian coordinate system, and may be interpreted in a broad sense including the three axes. For example, the x-axis, y-axis, and z-axis may be orthogonal to each other, but may refer to different directions that are not orthogonal to each other.

FIG. 1 is a schematic conceptual diagram of a printing system in accordance with one or more embodiments of the present disclosure.

As illustrated in FIG. 1, the printing system may include a user device 10, a controller 20, a printing device 30, a substrate 300, and a driving stage 320. For example, the printing device 30 may perform a printing operation based on printing data from the controller 20 or a separate driving signal generated based on the printing data.

The controller 20 may generate a driving signal for driving the printing operation of the printing device 30. Additionally, or alternatively, the controller 20 may generate the printing data.

The printing data may be or include data converted into a preset format for driving of the printing device 30. For example, the printing data may include position data for a position of the printing device 30, at which ink is to be discharged, and volume data for the amount of ink to be discharged from each nozzle provided in the printing device 30. The terms "eject ink" and "discharge ink" may be used interchangeably herein.

The driving signal is a signal waveform and may be a signal for commanding the printing operation of the printing device 30. For example, based on a waveform or frequency of the driving signal, the printing system (e.g., controller 20) may control the position of the printing device 30 at which ink is discharged (or to be discharged) and/or determine the amount of ink to discharge from each nozzle.

For example, the controller 20 and the printing device 30 may transmit and receive data, and the printing device 30 may receive the driving signal from the controller 20. The printing device 30 may perform the printing operation according to the received driving signal.

The user device 10 is a computing device for executing an application program, an application, and the like. The user device 10 may be a user equipment, a computer, a server, or the like. The user device 10 may receive a user input from a user, convert the received user input to a data signal, and transmit the data signal to the controller 20.

Although not illustrated, the user device 10 may be connected to an input device and an output device via a wired connection and/or wirelessly. The input device may be a user interface such as, for example, a key pad, a dome switch, a touch pad (e.g., contact capacitance method, pressure resistance film method, infrared detection method, surface ultrasound conduction method, integral tension measurement method, piezo effect method, or the like), a mouse, a remote controller, a jog wheel, and a jog switch. The output device may include a display. The display provides a result image output from the user device 10, allowing an operator to monitor a displayed image. The display may provide the operator with visual information and/or auditory information about the printing operation. The display may be a computer screen, a TV screen, a mobile terminal screen, or a projector. In an example in which the display is a touch screen, the touch screen may function as an input device.

The printing device 30 is a device capable of discharging ink to a desired position of the substrate 300 (e.g., onto a target location on the substrate 300) as described herein, and the printing device 30 may be a device capable of performing an inkjet printing operation. For example, the printing device 30 may perform the printing operation based on the driving signal. In an example, the driving signal may include a dummy driving signal, a first driving signal, and a second driving signal.

The substrate 300 is a target of printing, which may be a target onto which ink is discharged. For example, the printing device 30 may discharge ink onto one or more target regions of the substrate 300. The driving stage 320 may be disposed below the substrate 300. In an example, the driving stage 320 and the substrate 300 are fixed to each other, and the substrate 300 may be moved together with the driving stage 320 as the driving stage 320 is moved. In another example, the drive stage 320 may be stationary (e.g., such that the driving stage 320 does not move), and the substrate 300 disposed on the drive stage 320 may alone be moved. For example, the substrate 300 may be moved on the driving stage 320 by air floating technology, and the driving stage 320 may be a component for applying the air floating technology to the substrate 300.

A driving device (not illustrated) may move the substrate 300 based on the number of pulses. For example, the driving device may move the substrate 300 based on the number of pulses of the electrical signal transmitted from the driving circuit. In an example, the driving device (not illustrated) may include a motor that moves the substrate 300 based on the number of pulses. In an example, the driving device (not illustrated) may be a device capable of discharging air in association with moving the substrate 300 and/or the driving stage 320, and the driving device may discharge air based on the number of pulses. For example, the driving device (not illustrated) may be a component that moves the substrate 300 by moving the driving stage 320. In another example, the driving device (not illustrated) may be a component that moves the substrate 300 floated on the driving stage 320 alone.

The printing head may be a head of the inkjet printing device 30. The printing head may include at least one nozzle for discharging an ink material. In an example in which the printing head includes a plurality of nozzles, the plurality of nozzles may be spaced apart by a certain distance. In an example, the printing head may discharge ink onto an upper surface of the substrate 300 according to a period obtained based on information on the number of pulses.

According one or more embodiments, the printing data may include position data for a position of the printing device 30 at which the printing device 30 is to discharge ink and volume data for the amount of ink to be discharged from each nozzle provided in the printing device 30.

Figure 2:
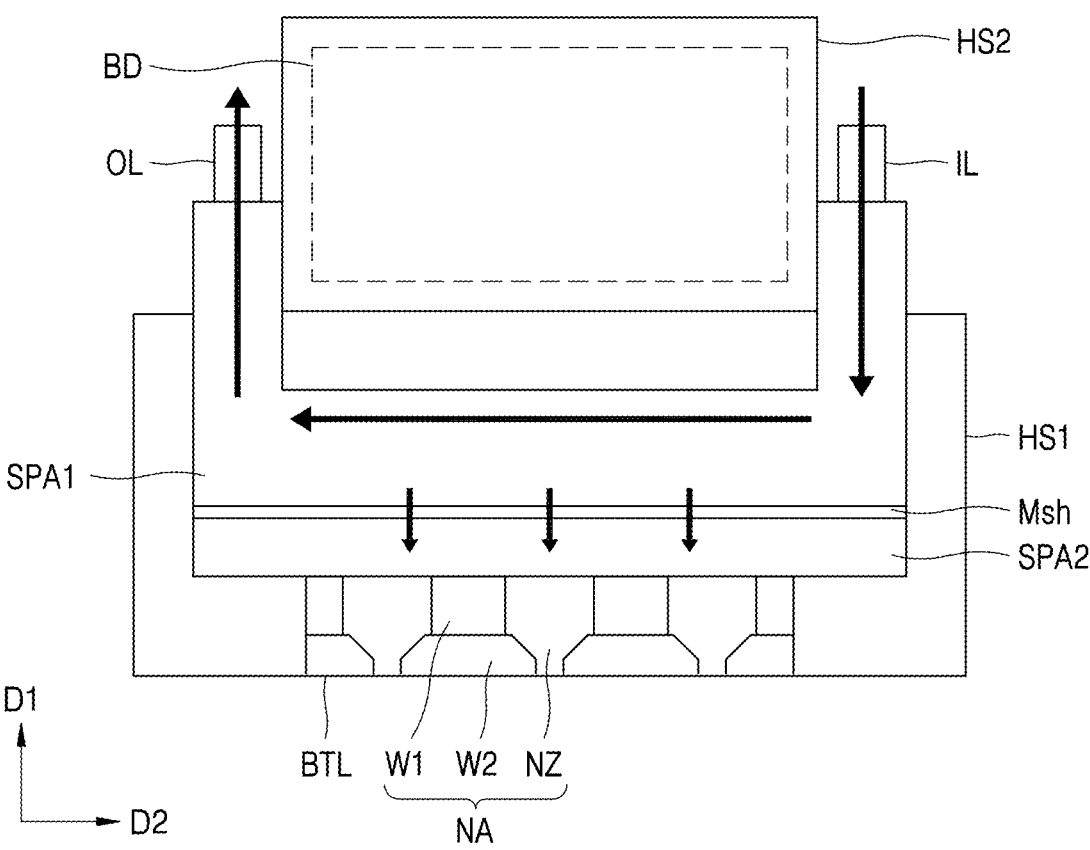
FIG. 2 is a schematic cross-sectional view illustrating an example of a printing head of FIG. 1 in accordance with one or more embodiments of the present disclosure.

FIG. 2 is a schematic cross-sectional view illustrating an example of the printing head of FIG. 1.

For reference, in the description of FIG. 2, the same or redundant descriptions described above with reference to FIG. 1 may be omitted. The printing head of FIG. 2 may be a component that prints a preset pattern on the substrate 300 by using a quantum dot ink composition, an organic ink composition used in an organic light emitting display, or the like.

As illustrated in FIG. 2, the printing head may include chambers SPA1 and SPA2 that store inkjet printing ink. The printing head may include a spray assembly NA that discharges ink from the chambers SPA1 and SPA2 to the outside. The chambers SPA1 and SPA2 and the spray assembly NA may be provided in a first housing HS1 of the printing head (an inkjet printing head). The first housing HS1 may be a structure connected to a second housing HS2, and a driving circuit (not illustrated) may be included inside the second housing HS2. A driving circuit BD may control a piezoelectric element layer W1 as described herein.

Ink of the inkjet printing head may be injected into the chambers SPA1 and SPA2 through an ink inlet IL and discharged to the outside from the chambers SPA1 and SPA2 through an ink outlet OL. As such, in some cases, ink may mainly move to the ink inlet IL—the chambers SPA1 and SPA2—the ink outlet OL. That is, for example, ink may travel through the ink inlet IL, chamber SPA1, chamber SPA2, and the ink outlet OL. The ink inlet IL may communicate with the chambers SPA1 and SPA2 to inject ink into the chambers SPA1 and SPA2 to pass through the first housing HS1, and the ink outlet OL may communicate with the chambers SPA1 and SPA2 to pass through the first housing HS1 to discharge ink from the chambers SPA1 and SPA2. That is, for example, the ink inlet IL, the chambers SPA1 and SPA2, and the ink outlet OL may be in fluid communication with one another. The ink inlet IL and the ink outlet OL may be opened or locked as needed, and the opening and locking may be manually or automatically controlled by the printing system.

The chambers SPA1 and SPA2 that store ink may include a first chamber SPA1 connected to the ink inlet IL and the ink outlet OL, and a second chamber SPA2 separated from the first chamber SPA1 by a mesh layer Msh.

Ink may be filtered by the mesh layer Msh while moving from the first chamber SPA1 to the second chamber SPA2. The ink moved to the second chamber SPA2 may be filtered and impurities may be removed therefrom. Ink may be discharged out of the spray assembly NA through an ink transfer passage of the spray assembly NA.

The spray assembly NA may discharge ink to the outside through a bottom surface BTL. The spray assembly NA may include an ink transfer passage NZ which passes through the bottom surface BTL of the spray assembly NA. The ink transfer passage NZ may be a nozzle controllable by the printing system in association with discharging a proper amount of ink (e.g., an amount of ink suitable for a printing operation and/or a composition measurement operation described herein) to the outside.

That is, for example, the spray assembly NA may include the ink transfer passage NZ disposed below the chambers SPA1 and SPA2 and connected to the inside of the chambers SPA1 and SPA2. The spray assembly NA may discharge ink passing through the ink transfer passage NZ to the outside through the bottom surface BTL.

The spray assembly NA may include the piezoelectric element layer W1 and a nozzle plate W2 disposed below the piezoelectric element layer W1. The piezoelectric element layer W1 may include a piezoelectric material such as, for example, a lead zirconate titanate (PZT). The piezoelectric element layer W1 may be controlled according to an electrical signal transmitted from the driving circuit and may include a piezoelectric actuator configuration. In some embodiments, the piezoelectric actuator configuration may be an already known piezoelectric actuator configuration. Additionally, or alternatively, the piezoelectric actuator configuration may be different from an already known piezoelectric actuator configuration.

The nozzle plate W2 may include an organic material such as, for example, a polyamide (PI) or a metal material such as, for example, stainless steel (SUS), iron (Fe), chromium (Cr), nickel (Ni).

The spray assembly NA may include an ink transfer passage NZ formed to pass through the piezoelectric element layer W1 and the nozzle plate W2. The ink transfer passage NZ may have a bottleneck structure. Therefore, ink discharged through the ink transfer passage NZ may have a higher hydraulic pressure through the bottleneck structure. That is, for example, the ink may have a higher hydraulic pressure due to passing through the bottleneck structure.

Hereinafter, aspects of a system for measuring composition of ink droplets according to one or more embodiments will be described in detail based on the above description.

Figure 3:
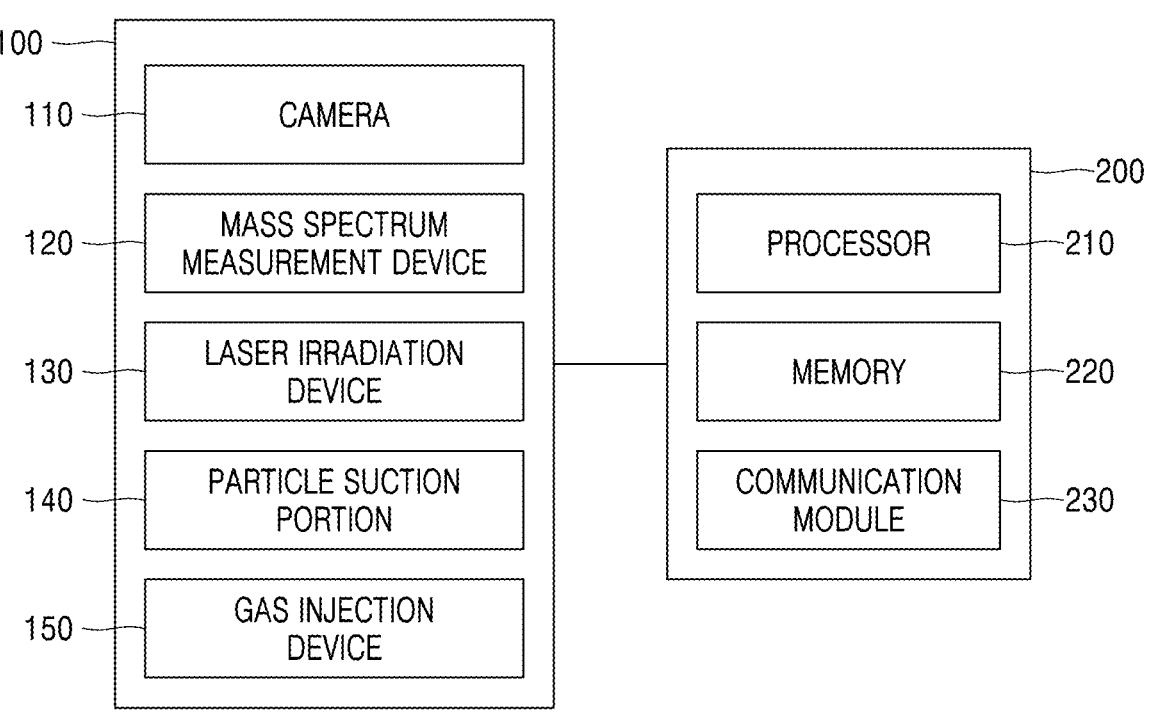
FIG. 3 is a schematic conceptual diagram of a system for measuring composition of ink droplets in accordance with one or more embodiments of the present disclosure.
Figure 4:
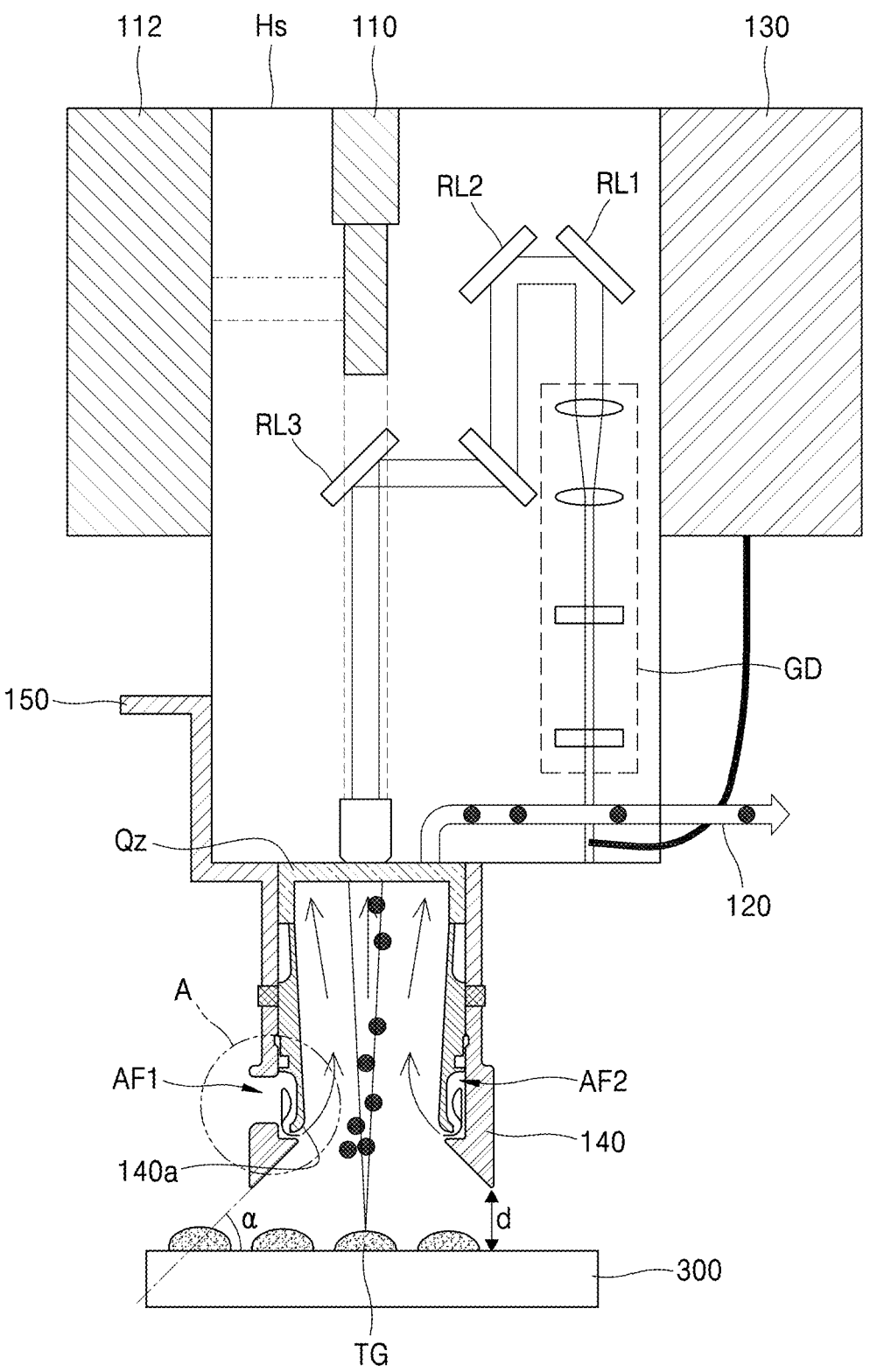
FIG. 4 is a schematic cross-sectional view of a composition measurement device of ink droplets of FIG. 3 in accordance with one or more embodiments of the present disclosure.

FIG. 3 is a schematic conceptual diagram of a system for measuring composition of ink droplets according one or more embodiments. FIG. 4 is a schematic cross-sectional view illustrating a composition measurement device of ink droplets of FIG. 3.

As illustrated in FIGS. 3 and 4, the system for measuring composition of ink droplets TG (hereinafter, system) according one or more embodiments may include a composition measurement device 100 capable of measuring the composition of ink droplets TG and a computing device 200.

The system may be implemented to measure a concentration of a target material contained in a plurality of ink droplets TG present on a substrate 300 (FIG. 4, this is equally applied below). For example, the plurality of ink droplets TG present on the substrate 300 have been discharged (pre-discharged) by the system onto the substrate 300 in association with measuring the composition of the plurality of ink droplets TG (or a portion of the plurality of ink droplets TG). The plurality of ink droplets TG may be discharged from nozzles provided in the inkjet printing head according to a preset volume.

The composition measurement device 100 capable of measuring the composition of ink droplets may include a camera device 110, a mass spectrum measurement device 120, a laser emitting device 130, a particle suction component 140 (also referred to herein as a particle suction portion), and a gas injection device 150.

The camera device 110 may be positioned such that the camera device 110 faces the substrate 300 or the plurality of ink droplets TG. The camera device 110 may be disposed above the substrate 300 such that the camera device 110 is spaced apart from the substrate 300 or the plurality of ink droplets TG. The camera device 110 may generate image data including all or a portion of the plurality of ink droplets TG. In some aspects, the image data may be data of an optical image. For example, in association with generating the image data, the camera device 110 may include at least one optical lens (not illustrated) and a driver (not illustrated) capable of driving the at least one optical lens (not illustrated). References to the camera device 110 generating the image data may include similar references to the camera device 110 obtaining the image data.

However, in some cases, the camera device 110 using the optical lens (not illustrated) may have a vignetting phenomenon. According to the vignetting phenomenon, image data obtained by the camera device 110 may be distorted. Therefore, in some cases, a gray scale obtained from the image data obtained by the camera device 110 may also be distorted according to the vignetting phenomenon. Aspects of the present disclosure support techniques for correcting image distortion caused by the vignetting phenomenon.

A range in which the vignetting phenomenon occurs may vary depending on an aperture, size, and refractive index of the optical lens (not illustrated) provided in the camera device 110, and the like. As the range in which the vignetting phenomenon occurs may vary depending on an aperture, size, and refractive index of the optical lens (not illustrated), and the like, the range in which the vignetting phenomenon occurs may have periodicity depending on the aperture, size, and refractive index of the optical lens (not illustrated) and the like. Thus, for example, when offset data is generated in accordance with the characteristics of concentration information measured in ink droplets in one range having periodicity, the generated offset data may be applied to the concentration information measured in ink droplets in a different range based on periodicity. The generated offset data is data derived from the ink droplets in one range, and the techniques described herein include applying the generated offset data to ink droplets in a different range based on periodicity. In some aspects, the application of the generated offset data in accordance with one or more embodiments of the present disclosure may correct or mitigate distortion resulting from the vignetting phenomenon.

For example, the printing system may pre-discharge a plurality of ink droplets TG onto the substrate 300. The plurality of ink droplets TG discharged onto (and existing on) the substrate 300 may be referred to as ink droplets TG "pre-discharged" or "pre-ejected" onto the substrate 300. In an example, the camera device 110 may generate first image data including first ink droplets in a first target range among the plurality of ink droplets TG of discharged onto the substrate 300.

For example, the camera device 110 may generate second image data including second ink droplets in a second target range among the plurality of ink droplets TG discharged onto the substrate 300.

In an example, the printing system may select the first target range. The first target range may be a range selected according to a preset reference among the plurality of ink droplets TG. The first ink droplets may be ink droplets disposed in a region selected according to the preset reference among the plurality of ink droplets TG. For example, the first target range may be defined or selected by a period (e.g., a temporal duration) in which the vignetting phenomenon occurs.

In an example, the printing system may obtain the second target range. The second target range may be a range obtained by excluding the first target range from the plurality of ink droplets TG. Additionally, or alternatively, second target range may be a portion of the range obtained by excluding the first target range. For example, the second target range may be a range defined or selected by the aforementioned a period (e.g., a temporal duration) among ink droplets obtained by excluding the first target range from the plurality of ink droplets TG.

The mass spectrum measurement device 120 may be a device for measuring a mass spectrum of each of ink droplets as a target. The mass spectrum may be a mass spectrum of ion particles (hereinafter, particles) resulting from the ionization of each of the first ink droplets in the first target range by laser beams. The mass spectrum measurement device 120 may apply an electric field or a magnetic field to the ion particles and divide the ion particles for each mass-to-charge ratio value (m/z) to detect the mass spectrum. For example, the mass spectrum measurement device 120 may apply an electric field or a magnetic field to the ion particles and determine a mass-to-charge ratio value (m/z) for each of the ion particles. The mass spectrum measurement device 120 may calculate the mass spectrum based on the respective mass-to-charge ratio values (m/z) of the ion particles.

The mass spectrum measurement device 120 may include a suction pipe configured to collect particles extracted by the particle suction component 140 as described herein. In the specification, descriptions of the suction pipe and illustration of the mass spectrum measurement device 120 are expressed for convenience of description, and the description of other components of the mass spectrum measurement device 120 are omitted for brevity. The mass spectrum measurement device 120 or the suction pipe of the mass spectrum measurement device 120 may be disposed above the particle suction component 140 by a certain distance as described herein. Additionally, or alternatively, the mass spectrum measurement device 120 or the suction pipe may be disposed above the substrate 300 or the plurality of ink droplets TG and spaced apart from the substrate 300 by a certain distance. The suction pipe may be a tube having non-stick properties such as, for example, a low friction coefficient. In an example, the suction pipe may be a PFA tube, may not have adhesion, and may be adjusted in length depending on a situation.

The laser emitting device 130 may be a device configured to emit laser beams toward each of the first ink droplets in the first target range. For example, the laser emitting device 130 may irradiate each of the first ink droplets with the laser beams. For example, the laser emitting device 130 may sequentially (or in parallel) irradiate each of the first ink droplets with laser beams. For example, the laser emitting device 130 may include a laser generator configured to generate laser beams and a laser guide GD configured to guide the generated laser beams to a desired point (e.g., ink droplets).

The particle suction component 140 may refer to a structure for extracting particles (e.g., ion particles described herein) generated from each of the first ink droplets. The particle suction component 140 may refer to a structure for extracting particles generated from each of the second ink droplets.

The particle suction component 140 may be arranged such that the particle suction component 140 is spaced apart from the substrate 300 by a certain distance. The particle suction component 140 may extract particles generated from each of the first ink droplets (or second ink droplets) using the Coanda effect. In an example supportive of generating the Coanda effect, an inner surface of the particle suction component 140 may have a Coanda surface 140a that is convex inward. In an example in which inert gases AF1 and AF2 are injected along the Coanda surface 140a, particles generated from target ink may move along the Coanda surface 140a in association with the Coanda effect.

The gas injection device 150 may be a device configured to inject the inert gases AF1 and AF2 along the Coanda surface 140a. The gas injection device 150 may be a component configured to provide power for extracting particles by the particle suction component 140 through gas injection. The gas injection device 150 may inject the inert gases AF1 and AF2 into the particle suction component 140 from the outside. For example, the gas injection device 150 may inject the inert gases AF1 and AF2 into the particle suction component 140 such that the inert gases AF1 and AF2 move along the Coanda surface 140a.

The inert gases AF1 and AF2 may include an element that does not react with the plurality of ink droplets TG discharged onto (and present on) the substrate 300. For example, the inert gases AF1 and AF2 may include elements such as, for example, helium (He) and argon (Ar). According to one or more embodiments of the present disclosure, to maximize the Coanda effect using helium gas and argon gas, the gas injection device 150 may be configured to inject each of the helium gas and the argon gas according to an injection speed of about 0.5 to about 1.5 L/min, in detail, 1 L/min. In particular, efficiency for forming fine-size particles may be increased using helium gas with argon gas, and the Coanda effect may increase.

As such, through the extracting or extraction of the particles using the Coanda effect, the techniques described herein support effective measurement (e.g., reduced complexity, relatively easier measuring) a concentration of a target material of ink droplets even within a factory performing a printing process. In an example in which the particles are extracted using the inert gases AF1 and AF2 according to the Coanda effect, even if the particles are extracted or extracted as described herein, contamination or defects within a process, such as, for example, ink or the printing device may not occur.

The terms "about" or "approximately" as used herein are inclusive of the stated value and include a suitable range of deviation for the particular value as determined by one of ordinary skill in the art, considering the measurement in question and the error associated with measurement of the particular quantity. The term "about" can mean within one or more standard deviations, or within ±30%, 20%, 10%, 5% of the stated value, for example.

The system may further include the driving stage 320 configured to move the substrate 300 in association with changing a target to irradiate with laser beams. That is, for example, the driving stage 320 may move the substrate 300 in association with changing the target to be irradiated with laser beams. The composition measurement device 100 capable of measuring the composition of ink droplets of the system may further include a volume measurement device (not illustrated) for measuring the volume of each of the first ink droplets (or second ink droplets). The volume measurement device (not illustrated) may generate side image data of ink droplets from a side of the ink droplets. The side image data may include width information and height information of the ink droplets, and volume information of the ink droplets may be derived based on the width information and the height information. The volume information may be derived by the computing device 200 as described herein.

The computing device 200 may include a processor 210, a memory 220, and a communication module 230. The computing device 200 may receive a user input from a user and perform a preset command or operational operation based on the received user input.

The processor 210 may execute one or more instructions stored in the memory 220 to control other components (e.g., other components of the composition measurement device 100). The processor 210 may execute the one or more instructions stored in the memory 220.

The processor 210 is configured to perform operations and control other devices. Mainly, the processor 210 may refer to a central computational device (CPU), an application processor (AP), a graphics processing device (GPU), or the like. The CPU, the AP or the GPU may include one or more cores therein, and the CPU, the AP or the GPU may operate using an operating voltage and a clock signal. However, the CPU or the AP may include several cores optimized for serial processing, while the GPU may include thousands of small and efficient cores designed for parallel processing.

The processor 210 may provide or process appropriate information or functions (e.g., information or functions related to the composition measurement device 100 and/or the printing device) to the user by processing input or output signals, data, and information, and the like through the components described above or driving an application program stored in the memory 220.

The memory 220 stores data supporting various functions of the computing device 200. The memory 220 may store a plurality of application programs (or application) driven by the computing device 200, data for an operation of the computing device 200, and instructions. At least some of these application programs may be downloaded from external servers through wireless communication. The application program may be stored in the memory 220, installed in the computing device 200, and driven to perform the operation (or function) of the computing device 200 by the processor 210.

The memory 220 may include at least one type of storage medium of a flash memory type, a hard disk type, a solid state disk (SSD) type memory, a silicon disk drive (SDD) type memory, a multimedia card micro type memory, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disk. The memory 220 may include a web storage configured to perform a storage function on the Internet.

The communication module 230 may perform a wired communication function. Alternatively, the communication module 230 transmits and receives information between a base station and a camera having a communication function through an antenna. The communication module 230 may include a modulator, a demodulator, and a signal processor. According to one or more embodiments of the present disclosure, wireless communication may be communication using a communication facility pre-installed by telecommunications companies and a wireless communication network using a frequency of the communication facility or may be short-range communication such as, for example, Bluetooth, Bluetooth low energy (BLE), Beacon, radio frequency identification (RFID), near field communication (NFC), infrared data association (IrDA), ultra wideband (UWB), and Zigbee.

According one or more embodiments, the computing device 200 may receive the first image data or second image data obtained from the camera device 110. The computing device 200 may obtain first gray scale information for each of the first ink droplets, which is included in the first image data, based on the received first image data. The computing device 200 may obtain second gray scale information for each of the second ink droplets, which is included in the second image data, based on the received second image data.

For example, the first image data obtained from the camera device 110 may include the first ink droplets in the first target range from among the plurality of ink droplets TG discharged onto (and present on) the substrate 300. The second image data obtained from the camera device 110 may include the second ink droplets in the second target range from among the plurality of ink droplets TG discharged onto (and present on) the substrate 300.

For example, to obtain the first gray scale information, the computing device 200 may generate a preparation command for the printing head, generate a control command for discharging the plurality of ink droplets TG onto the substrate 300, and obtain the first image data on the first ink droplets. In an example, the computing device 200 may provide the preparation command and the control command to the printing system (e.g., to the printing head). The computing device 200 may obtain the first gray scale information of each of the first ink droplets based on the first image data.

For example, the first gray scale information may be obtained through the following operations.

(1) Cropping a region including each of first ink droplets to obtain the first gray scale information of each of the first ink droplets from the first image data including the first ink droplets. For example, the operation may include cropping the region from the first image data including the first ink droplets, in which the region includes the first ink droplets, and generating a cropped image based on the cropping.

(2) Performing a pre-process for the cropped image.

(3) Extracting a region of interest (ROI) including each of the first ink droplets after performing the pre-process.

(4) Calculating the first gray scale information by measuring a histogram for the extracted ROI.

For example, the computing device 200 may obtain first concentration information of a target material contained in each of the first ink droplets based on the first gray scale information. According to one or more embodiments of the present disclosure, the first concentration information may be obtained through the following operations.

(1) Obtaining the first gray scale information.

(2) Obtaining the first concentration information of the target material contained in each of the first ink droplets based on a pre-prepared concentration-gray scale information curve.

(3) Obtaining volume information of each of the first ink droplets (using the volume measurement device (not illustrated)) and quantifying the first concentration information based on the volume information (e.g., concentration information per unit volume is obtained or is normalized based on a volume value of some of the ink droplets described above).

For example, the computing device 200 may receive a mass spectrum for particles generated from each of the first ink droplets from the mass spectrum measurement device 120.

For example, the computing device 200 may obtain second concentration information of a target material contained in each of the first ink droplets based on the received mass spectrum.

According to one or more embodiments of the present disclosure, the second concentration information may be obtained through the following operations.

(1) Obtaining the mass spectrum of the particles generated by each of the first ink droplets.

(2) Obtaining the second concentration information of each of the first ink droplets based on a pre-prepared concentration-mass spectrum curve.

(3) Obtaining volume information of each of the first ink droplets (using the volume measurement device (not illustrated)) and quantifying the second concentration information based on the volume information (e.g., concentration information per unit volume is obtained or is normalized based on volume values of the first ink droplets described above).

For example, the computing device 200 may obtain offset data based on the first concentration information and the second concentration information. According to one or more embodiments of the present disclosure, the offset data may be obtained through the following operations.

(1) Calculating a difference value between the first concentration information obtained based on the first gray scale information and the second concentration information obtained based on the mass spectrum.

(2) Obtaining offset data for correcting the first gray scale information based on the calculated difference value.

According to one or more embodiments of the present disclosure, the offset data may be data for correcting distortion of the first concentration information caused by the vignetting effect, as described above.

For example, the first concentration information may be obtained using the camera device 110, and the concentration measurement method using the camera device 110 may rapidly measure a concentration. However, distortion may occur in the measured concentration according to the vignetting effect. However, the second concentration information is a concentration measured using a mass spectrum in accordance with one or more embodiments of the present disclosure as described herein, and the concentration measurement method using a mass spectrum may have a relatively low concentration measurement rate but may be free from the vignetting effect. That is, for example, the concentration measurement method using the mass spectrum may measure a concentration more accurately than the concentration measurement method using the camera device 110.

Therefore, the system may apply the concentration measurement method using the mass spectrum to each of the first ink droplets in the first target range and obtain the second concentration information. The concentration measurement method using the mass spectrum has a low concentration measurement rate, and the techniques described herein may correct distortion according to the vignetting effect by first obtaining offset data, applying the concentration measurement method using the camera device 110 to each of the second ink droplets in the second target range, and applying the offset data to the second gray scale information associated with each of the second ink droplets in the second target range. As such, the techniques described herein include using the obtained offset data to correct gray scale information associated with third ink droplets in a third target range, fourth ink droplets in a fourth target range, $n^{th}$ ink droplets in an $n^{th}$ target range, and the like, in which the gray scale information to be corrected is obtained through applying the concentration measurement method using the camera device 110 to the third ink droplets in the third target range, fourth ink droplets in the fourth target range, $n^{th}$ ink droplets in the $n^{th}$ target range, and the like.

For example, the computing device 200 may obtain the second gray scale information for each of the second ink droplets in the second target range among the plurality of ink droplets TG, apply the previously obtained offset data to the second gray scale information, and obtain third concentration information (corrected concentration information) based on the second gray scale information and the offset data.

According to one or more embodiments of the present disclosure, the second gray scale information may be obtained through the following operations.

(1) Cropping a region including each of second ink droplets to obtain the second gray scale information of each of the second ink droplets from the second image data including the second ink droplets. For example, the operation may include cropping the region from the second image data including the second ink droplets, in which the region includes the second ink droplets, and generating a cropped image based on the cropping.

(2) Performing a pre-process for the cropped image (3) Extracting an ROI including each of the second ink droplets after performing the pre-process.

(4) Calculating the second gray scale information by measuring a histogram for the extracted ROI.

According to one or more embodiments of the present disclosure, the third concentration information may be obtained through the following operations.

(1) Correcting the second gray scale information based on the offset data.

(2) Obtaining the third concentration information according to the corrected second gray scale information based on a pre-prepared concentration-gray scale information curve.

For example, the computing device 200 may generate printing sequence information based on the third concentration information. The printing sequence information may be information on a sequence in which a printing process is to be performed according to a predefined pattern.

For example, when the obtained third concentration information (e.g., a concentration value) is less than a preset concentration value, the printing sequence information may be information on a printing sequence to which the third concentration information is applied. For example, when the third concentration information is less than a preset concentration value, the computing device 200 may generate the printing sequence information to further perform a printing process on a corresponding pixel. For example, when the third concentration information is less than a preset concentration value, the computing device 200 may generate the printing sequence information to increase a discharge amount of ink of a nozzle corresponding to the third concentration information. The printing sequence information in the specification may be or include a driving algorithm for driving the printing device or the inkjet printing head.

The computing device 200 may generate a control command for performing the printing process based on the printing sequence information and transmit the control command to the printing device or the inkjet printing head.

For example, the aforementioned target material contained in ink droplets may include titanium dioxide (TiO$_2$). The luminescent efficiency of a QD display device may vary depending on a concentration of TiO$_2$ in the ink droplets for QD. Therefore, in some cases, when the concentration of TiO$_2$ is different for each pixel, defects may occur, such as, for example, stains in the QD display device. Embodiments of the present disclosure support effective analysis of the concentration information of TiO$_2$ in the ink droplets in a manufacturing process of the QD display device.

As illustrated in FIG. 4, the laser emitting device 130 of the system may generate laser beams. The laser emitting device 130 may include a laser guide GD configured to guide laser beams to accurately irradiate each of the first ink droplets (or second ink droplets) and may include a plurality of reflective lenses RL1, RL2, and RL3. The laser guide GD may include a polarizing film, a convex lens, and a concave lens, and the laser guide GD may guide the generated laser beams toward the reflective lens. The plurality of reflective lenses RL1, RL2, and RL3 may refract laser beams to a desired position toward each of the first ink droplets (or second ink droplets).

To block external light from irradiating a path through which laser beams pass, the composition measurement device of ink droplets of the system may further include the laser guide GD and a housing Hs including the plurality of reflective lenses RL1, RL2, and RL3 therein. For example, the inside of the housing Hs may be a dark region or dark enclosure. The aforementioned camera device 110 may be further provided inside the housing Hs.

An upper surface of the particle suction component 140 may include a transparent material. For example, the upper surface or at least a portion of the upper surface of the particle suction component 140 may include a quartz unit Qz including quartz.

One surface of the housing Hs in contact with the upper surface of the particle suction component 140 may include a transparent material or may be open (e.g., a surface of the housing HS may include a hole). In an example in which a surface of the housing Hs is open (e.g., includes a through hole), the quartz unit Qz of the particle suction component 140 may be installed in the through hole of the surface of the housing Hs.

Laser beams generated by the laser emitting device 130 may irradiate target ink through the quartz unit Qz. For example, the generated laser beams may travel through the quartz unit Qz and toward the target ink such that the laser beams irradiate the target ink. The camera device 110 may obtain image data for each of the first ink droplets (or second ink droplets) through the quartz unit Qz. To this end, the quartz unit Qz may be disposed above the substrate 300 or the plurality of ink droplets Tg to be spaced apart therefrom by a certain distance d.

A white light illumination device 112 may be a device configured to generate white light for generating the first image data (or second image data) of the camera device 110. The white light illumination device 112 may generate white light of predefined specifications to obtain exact gray scale information and obtain concentration information of the target material and may irradiate the aforementioned quartz unit Qz with white light. For example, the white light illumination device 112 may generate the white light, and the white light may be incident the quartz unit Qz.

Figure 5:
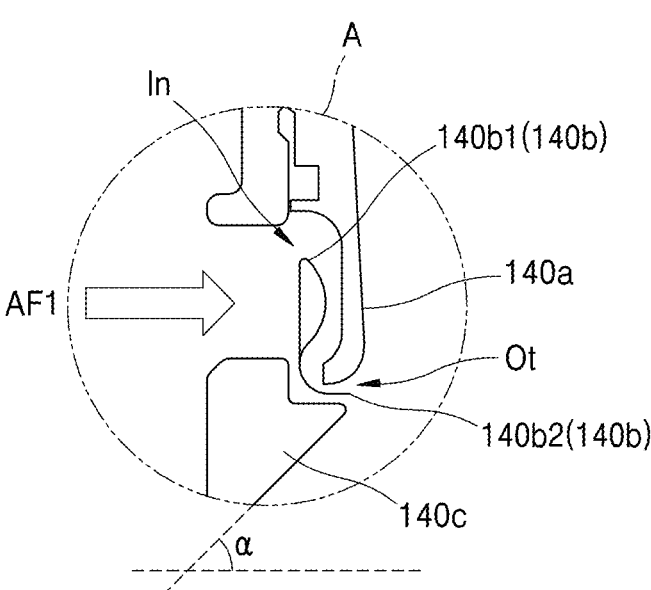
FIG. 5 is a schematic cross-sectional view illustrating a portion A of FIG. 4.

FIG. 5 is a schematic cross-sectional view illustrating a portion A of FIG. 4.

For reference, in the description of FIG. 5, the same or redundant description of FIGS. 1 and 2 described above may be omitted.

As illustrated in FIG. 5, the gas injection device 150 may implement a higher pressure than the inside of the particle suction component 140 to inject the inert gases AF1 and AF2 from the outside of the particle suction component 140. That is, for example, the gas injection device 150 may inject the inert gases AF1 and AF2 at a pressure higher than the pressure inside of the particle suction component 140.

A side wall of the particle suction component 140 may include an inlet In through which the inert gases AF1 and AF2 are injected, and an outlet Ot from which the inert gases AF1 and AF2 are discharged. The inlet In and the outlet Ot may be formed to pass through the side wall of the particle suction component 140. For example, an entrance 140c through which the inert gases AF1 and AF2 are injected to a through hole formed to pass through the side wall of the particle suction component 140 may be the inlet In and an exit from which the inert gases AF1 and AF2 are discharged may be the outlet Ot.

A cross-sectional area of the inlet In may be larger than a cross-sectional area of the outlet Ot. According to the principle of Bernoulli, as the cross-sectional area of the outlet Ot is reduced, a fluid speed of the inert gases AF1 and AF2 discharged through the outlet Ot may increase.

For example, the outlet Ot may guide the inert gases AF1 and AF2 such that the inert gases AF1 and AF2 are discharged along the Coanda surface 140a. For example, the particle suction component 140 may include a guide 140b disposed between the inlet In and the outlet Ot.

As illustrated in FIG. 5, an end 140b1 of the guide 140b may be disposed around the inlet In, and another end 140b2 of the guide 140b may be disposed around the outlet Ot. The end 140b1 of the guide 140b may have a shape supportive of controlling a flow of the inert gases AF1 and AF2 from the inlet In from outlet Ot. The other end 140b2 of the guide 140b may have a shape supportive of moving the inert gases AF1 and AF2 along the guide 140b from the outlet Ot.

For example, the end 140b1 of the guide 140b may have a convex surface that is convex toward a region through which the inert gases AF1 and AF2 pass. An opposite surface placed in an opposite direction to the convex surface may have a flat plane.

For example, the other end 140b2 of the guide 140b may protrude such that the other end 140b2 passes through the outlet Ot. For example, the other end 140b2 of the guide 140b may be curved, and the curve of the other end 140b2 may be approximately parallel to a curved direction of the Coanda surface 140*a*. For example, the other end 140*b*2 of the guide 140*b* may be curved to have a curve toward an upper side of the particle suction component 140 from the outlet Ot.

For example, the entrance 140*c* of the particle suction component 140 may include an inclined inner surface having a cross section becomes narrower in a direction away from the substrate 300. For example, the inclined inner surface of the entrance 140*c* of the particle suction component 140 may have an inclination angle as an acute angle to the substrate 300 based on a direction in which the substrate 300 extends.

Hereinafter, a method of measuring composition of ink droplets according to another embodiment will be described in detail based on the above description.

For reference, a subject that performs the method of measuring composition of ink droplets (hereinafter, measurement method) may be the concentration measurement system of an ink material as described herein, the computing device 200 described herein, or the processor 210 described herein of the computing device 200.

Figure 6:
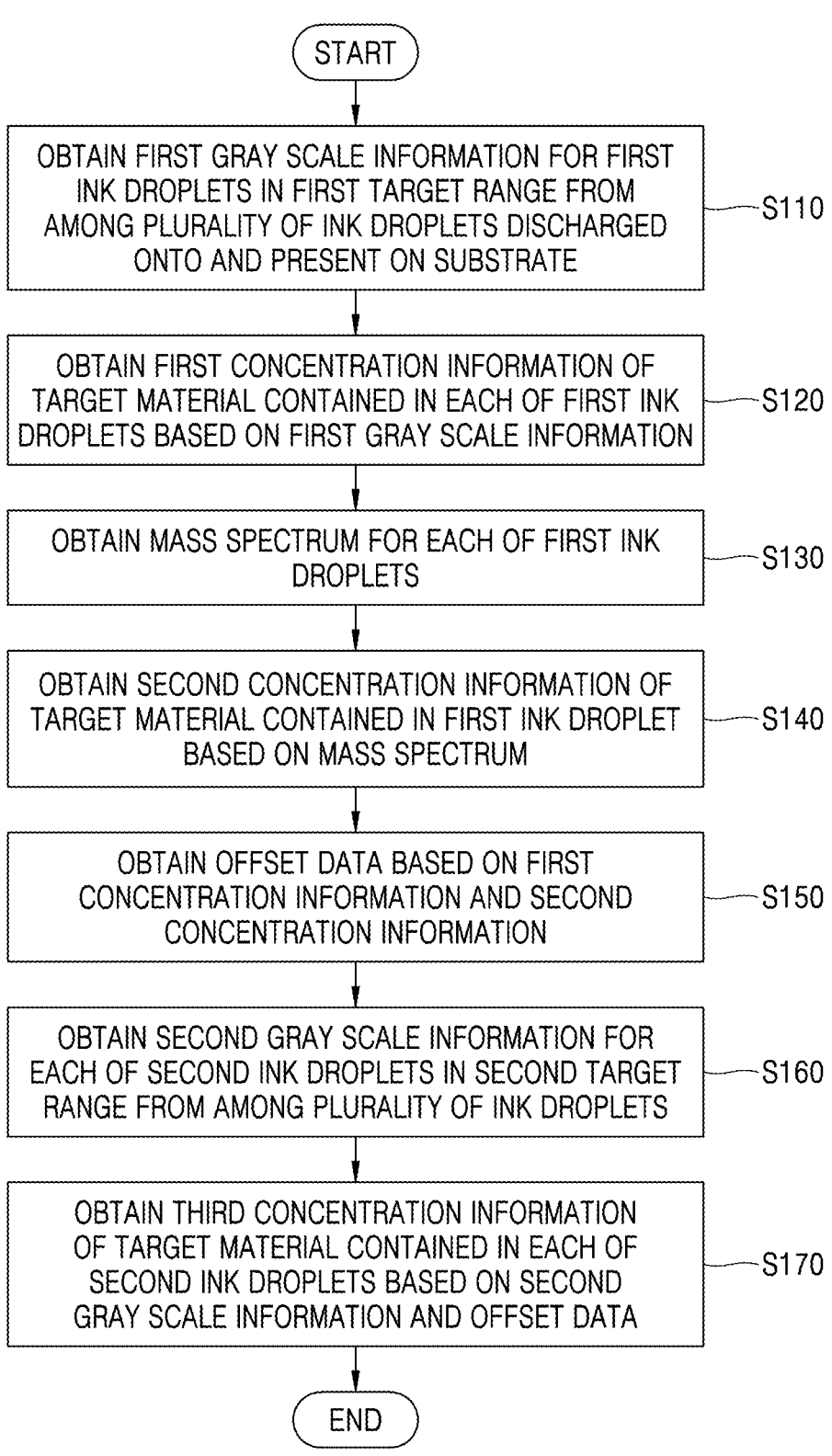
FIG. 6 is a schematic flowchart of a method of measuring composition of ink droplets in accordance with one or more embodiments of the present disclosure.

FIG. 6 is a schematic flowchart of a method of measuring composition of ink droplets according to one or more embodiments.

For reference, in the description of FIG. 6, repeated or redundant descriptions of the above descriptions may be omitted. In the descriptions of the method herein, the operations may be performed in a different order than the order shown and/or described, or the operations may be performed in different orders or at different times. Certain operations may also be left out of the flowcharts, one or more operations may be repeated, or other operations may be added.

As illustrated in FIG. 6, the measurement method may include obtaining first gray scale information for each of the first ink droplets in the first target range among the plurality of ink droplets TG (S110).

Operation S110 of obtaining the first gray scale information may include receiving first image data obtained by the camera device 110 and obtaining the first gray scale information for each of the first ink droplets, contained in the first image data, based on the received first image data. The first image data may be data of an image including the first ink droplets in the first target range among the plurality of ink droplets TG.

For example, in operation S110 of obtaining the first gray scale information, to obtain the first gray scale information, the method may include generating a preparation command for the printing head, generating a control command for discharging the plurality of ink droplets TG on the substrate 300, and obtaining the first image data including the first ink droplets in the first target range among the plurality of ink droplets TG. In operation S110 of obtaining the first gray scale information, the first gray scale information for each of the first ink droplets may be obtained based on the first image data.

For example, operation S110 of obtaining the first gray scale information may include the following operations.

(1) Cropping a region including each of first ink droplets to obtain the first gray scale information from the first image data including the first ink droplets. Generating a cropped image based on the cropping.

(2) Performing a pre-process for the cropped image.

(3) Extracting an ROI including each of the first ink droplets after the pre-process is performed.

(4) Calculating gray scale information by measuring a histogram for the extracted ROI.

The measurement method may further include obtaining first concentration information of a target material contained in each of the first ink droplets based on the first gray scale information (S120). The operation of obtaining the first concentration information may include the following operations.

(1) Obtaining the first gray scale information.

(2) Obtaining the first concentration information of the target material contained in each of the first ink droplets based on a pre-prepared concentration-gray scale information curve.

(3) Obtaining volume information of each of the first ink droplets and quantifying the first concentration information based on the volume information (e.g., concentration information per unit volume is obtained or is normalized based on a volume value of the ink droplets described above).

The measurement method may further include obtaining a mass spectrum for each of the first ink droplets (S130).

In operation S130 of obtaining the mass spectrum, the mass spectrum for particles generated from each of the first ink droplets may be received from the mass spectrum measurement device 120.

The measurement method may further include obtaining second concentration information of a target material contained in each of the first ink droplets based on the mass spectrum (S140). Operation S140 of obtaining the second concentration information may include the following operations.

(1) Obtaining the mass spectrum of the particles generated by each of the first ink droplets.

(2) Obtaining the second concentration information of each of the first ink droplets based on a pre-prepared concentration-mass spectrum curve.

(3) Obtaining volume information of each of the first ink droplets and quantifying the second concentration information based on the volume information (e.g., concentration information per unit volume is obtained or is normalized based on a volume value of each of first ink droplets described above).

The measurement method may include obtaining offset data based on the first concentration information and the second concentration information (S150). Operation S150 of obtaining the offset data may include the following operations.

(1) Calculating a difference value between the first concentration information obtained based on the first gray scale information and the second concentration information obtained based on the mass spectrum.

(2) Obtaining offset data for correcting the gray scale information based on the calculated difference value.

The measurement method may further include obtaining the second gray scale information for each of the second ink droplets in the second target range among the plurality of ink droplets TG (S160).

In operation S160 of obtaining the second gray scale information, the second image data including the second ink droplets in the second target range among the remaining ink droplets from which the first gray scale information is not obtained may be obtained, and the second gray scale information of each of the second ink droplets may be obtained based on the obtained second image data.

For example, operation S610 of obtaining the second gray scale information may include the following operations.

(1) Cropping a region including each of second ink droplets to obtain the second gray scale information from the second image data including the second ink droplets.

(2) Performing a pre-process on an image formed by cropping a region including second target ink droplets.

(3) Extracting an ROI including each of the second ink droplets after the pre-process is performed.

(4) Calculating the second gray scale information for each of the second ink droplets by measuring a histogram for the extracted ROI.

The measurement method may further include obtaining third concentration information of a target material contained in each of the second ink droplets based on the second gray scale information and the offset data (S170). Operation S170 of obtaining the third concentration information of the target material may include the following operations.

(1) Applying the obtained offset data to the second gray scale information.

(2) Obtaining the third concentration information (e.g., a concentration value) of the target material contained in the second target ink droplets based on the second gray scale information corrected by applying the offset data and a pre-prepared concentration-gray scale information curve.

The measurement method may further include generating printing sequence information based on the third concentration information (S180). In this case, the printing sequence information may be information on a sequence in which a printing process is performed according to a predefined pattern.

For example, when the obtained third concentration information (e.g., a concentration value) is less than a preset concentration value, the printing sequence information may be information on a printing sequence to which the third concentration information is applied. For example, when the third concentration information is less than a preset concentration value, operation S180 of generating the printing sequence information may include generating the printing sequence information to further performing a printing process on a corresponding pixel.

For example, when the third concentration information (e.g., a concentration value) is less than a preset concentration value, operation S180 of generating the printing sequence information may include generating the printing sequence information to increase a discharge amount of ink of a nozzle corresponding to the third concentration information. The printing sequence information in the specification may be or include a driving algorithm for driving a printing device or an inkjet printing head.

The measurement method may further include generating a control command for performing a printing process based on the printing sequence information (S190). In an example, the control command may be a command for controlling the printing device or the inkjet printing head to perform a printing operation based on the printing sequence information described above.

Operation S190 of generating the control command may include generating the control command for performing the printing process based on the printing sequence information and transmitting the control command to the printing device or the inkjet printing head.

According one or more embodiments as described above, the system for measuring composition of ink droplets and the method of measuring composition of ink droplets for a more precise fine inkjet printing process may be implemented. This effect is not limited to the scope of the disclosure.

As such, the disclosure has been described with reference to the embodiments illustrated in the drawings, but the embodiments are examples, and those skilled in the art will understand that various modifications and equivalent other embodiments are possible therefrom. Therefore, the true technical scope of the disclosure should be determined by the technical spirit of the appended claims.

It should be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A system for measuring composition of ink droplets, the system comprising:
   a camera device configured to generate first image data including first ink droplets in a first target range from among a plurality of ink droplets discharged onto and present on a substrate;
   a laser irradiation device configured to generate particles by irradiating each of the first ink droplets with laser beams;
   a particle suction component spaced apart from the substrate by a distance and including an inner surface, wherein the inner surface is a Coanda surface and is convex inward;
   a gas injection device configured to inject inert gas into the particle suction component to move the inert gas along the Coanda surface; and
   a mass spectrum measurement device configured to measure a mass spectrum of the particles extracted through the particle suction component with the inert gas.

2. The system of claim 1, wherein the particle suction component includes:
   an inlet through which the inert gas is injected from an outside of the particle suction component; and
   an outlet from which the inert gas is discharged into the particle suction component.

3. The system of claim 2, wherein the particle suction component further includes a guide configured to guide the inert gas to be discharged along the Coanda surface.

4. The system of claim 1, further comprising a driving stage configured to move the substrate to change a target to irradiate with the laser beams.

5. The system of claim 1, further comprising a computing device configured to obtain first gray scale information for each of the first ink droplets based on the first image data.

6. The system of claim 5, wherein the computing device is configured to obtain first concentration information of a target material included in each of the first ink droplets based on the first gray scale information.

7. The system of claim 6, wherein the computing device is configured to obtain second concentration information of the target material included in each of the first ink droplets based on the mass spectrum.

8. The system of claim 7, wherein the computing device is configured to obtain offset data based on the first concentration information and the second concentration information.

9. The system of claim 8, wherein the camera device is configured to generate second image data including second ink droplets in a second target range from among the plurality of ink droplets.

10. The system of claim 9, wherein the computing device is configured to obtain second gray scale information for each of the second ink droplets based on the second image data.

11. The system of claim 10, wherein the computing device is configured to obtain third concentration information of a target material included in each of the second ink droplets based on the second gray scale information and the offset data.

12. The system of claim 11, wherein the computing device is configured to generate printing sequence information based on the third concentration information and generate a control command for performing a printing process based on the printing sequence information.

13. The system of claim 6, wherein the target material includes $TiO_2$.

14. A method of measuring composition of ink droplets, the method comprising:

obtaining first gray scale information for each of first ink droplets in a first target range from among a plurality of ink droplets discharged onto and present on a substrate;

obtaining first concentration information of a target material included in each of the first ink droplets based on the first gray scale information;

obtaining a mass spectrum for each of the first ink droplets;

obtaining second concentration information of the target material included in each of the first ink droplets based on the mass spectrum;

obtaining offset data based on the first concentration information and the second concentration information;

obtaining second gray scale information for each of second ink droplets in a second target range from among the plurality of ink droplets; and obtaining third concentration information of the target material included in each of the second ink droplets based on the second gray scale information and the offset data.

15. The method of claim 14, further comprising generating printing sequence information based on the third concentration information.

16. The method of claim 15, further comprising generating a control command for performing a printing process based on the printing sequence information.

17. The method of claim 14, wherein the obtaining of the first gray scale information includes:

generating a preparation command for a printing head;

generating a control command for discharging the plurality of ink droplets onto the substrate; and obtaining first image data including the first ink droplets.

18. The method of claim 17, wherein the obtaining of the first gray scale information further includes obtaining the first gray scale information for each of the first ink droplets based on the first image data.

19. The method of claim 14, wherein the obtaining of the second concentration information of the target material includes:

obtaining the second concentration information of the target material included in each of the first ink droplets based on a pre-prepared concentration-mass spectrum curve; and obtaining volume information of each of the first ink droplets and quantifying the second concentration information based on the volume information.

20. The method of claim 14, wherein the target material includes $TiO_2$.

* * * * *